March 23, 1971  A. D'HEURLE  3,572,388

HYDRAULIC TRANSMISSION UNITS

Filed June 11, 1969

INVENTOR:
ALBERT D'HEURLE by

Breitenfeld & Levine

ATTORNEYS

United States Patent Office 3,572,388
Patented Mar. 23, 1971

3,572,388
HYDRAULIC TRANSMISSION UNITS
Albert d'Heurle, Plessis-Robinson, France, assignor to
Cibie-Angers, Bobigny, France
Filed June 11, 1969, Ser. No. 832,397
Claims priority, application France, June 14, 1968,
154,943
Int. Cl. F16l *55/04;* F15b *15/17*
U.S. Cl. 138—26                                    5 Claims

ABSTRACT OF THE DISCLOSURE

A hydraulic transmission unit for orientating the headlamp of a vehicle and including parallel hydraulic transmission and hydraulic detection circuits connected to a compensator device consisting of a pair of chambers, one of which is connected to the transmission circuit while the other is connected to the detection circuit whereby variations in temperature cause equal variations in the volumes of the chambers.

---

Figure 2:
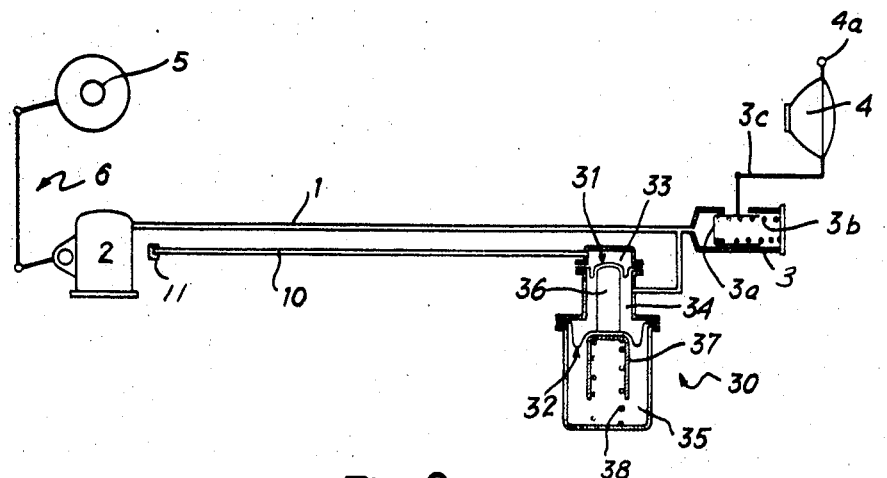

This invention relates to hydraulic transmission units for use especially but not exclusively in controlling the movements of the headlamps of vehicles.

There is already known hydraulic systems for operating and controlling the orientation in height of the headlamps of a vehicle depending on its attitude. Systems for this purpose generally comprise a device for detecting relative movements of the sprung part in relation to the unsprung part of the vehicle at the front axle and the rear axle respectively, these movements then being summed algebraically to determine the control movement to be applied to the headlamps. In systems of this type, hydraulic circuits are used to transmit to the headlamps the variations in total movement corresponding to the variations in vehicle attitude. In addition, hydraulic circuits can naturally be employed for the operation of the algebraic summing of the two aforesaid relative movements.

In some simplified systems, as very often the relative movement of the sprung part and of the non-sprung part at the rear axle of the vehicle is preponderant relative to the movement at the front axle, only the relative movement at the rear axle is used to control movement of the headlamps.

In each case, and whatever the practical methods of manufacture and arrangement of the control systems of this type, one essential problem resides in the fact that hydraulic circuits mounted on motor vehicles undergo very considerable variations of temperature, both generally as well as locally. Generally, the temperature of the circuits is linked to the ambient temperature and as a result it is necessary to provide a large volumetric space in the system to compensate for variations from summer to winter. Locally, and according to their proximity to certain parts of the engine, certain parts of the hydraulic circuits can be heated to a greater or lesser degree when the engine is running.

In practice it has been established that these variations in temperature are extremely harmful for the controlling movements or adjustments of the headlamps depending on the attitude of the vehicle. In fact, they cause considerable disorder, both temporarily (corresponding to the local temperature variations) as well as permanently (corresponding to the general or ambient temperature variations).

It is an object of the present invention to abviate or mitigate this problem.

According to the present invention there is provided a hydraulic transmission unit for the transmission of movement to a component, especially but not exclusively the headlamp of a vehicle, and comprising a hydraulic transmission circuit, a detection circuit substantially identical to the transmission circuit and in parallel therewith, and a compensator device to which the circuits are connected such that when variation in the volume of the liquid in the detection circuit occurs there is created an identical variation of volume for the liquid in the transmission circuit, whereby since the two circuits due to their construction and arrangement are subjected to the same local and overall variations in temperature, such temperature variations have substantially no affect on the transmission circuit.

Figure 1:
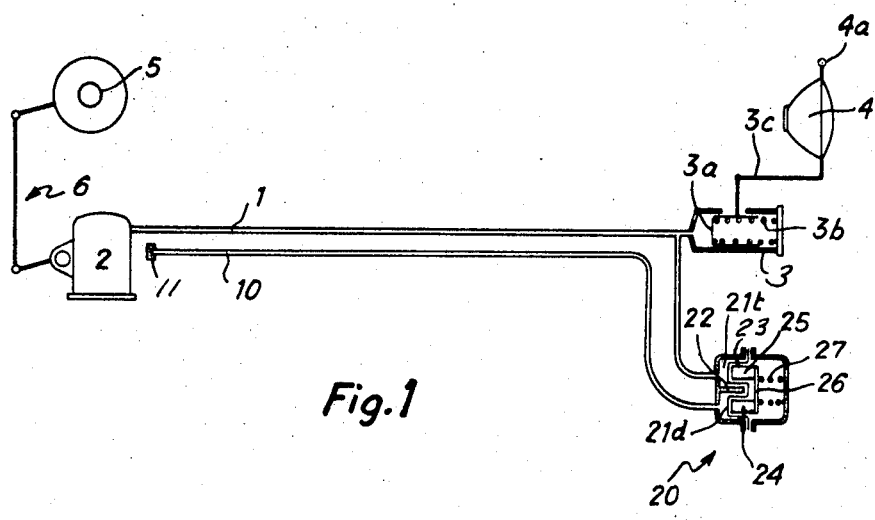

Embodiments of the present invention will now be described, by way of example, with reference to the accompanying drawing, in which:

FIG. 1 is a diagrammatic view of a hydraulic transmission unit with temperature compensation according to the present invention; and, FIG. 2 is a similar view of a modified circuit.

In the embodiments of the hydraulic transmission unit shown in FIGS. 1 and 2, movement is transmitted through the intermediary of a hydraulic transmission circuit or pipe 1 from a control member 2 to a cylinder 3 housing a piston 3a having a spring 3b acting against the hydraulic fluid. Displacement of the piston 3a effects, through the intermediary of a system of rods 3c, the pivoting of at least one headlamp 4 about a horizontal pivot 4a (adjustment of height).

The control member 2 is not described here in detail. It will be manifest that any transducer system capable of transforming into a hydraulic displacement the algebraic sum of relative movements of the sprung part and of the unsprung part of the vehicle at the front and rear, respectively. Transducer devices of this type are not part of the present invention. Examples of such devices are disclosed in French Pats. 1,455,408; 1,467,176 and 1,475,011.

The present invention is concerned with effecting compensation for temperature variations in the transmission circuit 1. For this purpose, according to the invention, there is connected to the transmission circuit 1 a detection circuit or pipe 10, of section, length, construction and constitution identical to those of the circuit 1. Circuit 10 is closed at one end by a fixed closure 11, the two circuits 1 and 10 being connected to a compensator device. The embodiments of FIGS. 1 and 2 only differ by the construction of the compensator device.

The compensator device 20 of FIG. 1 comprises a housing including two chambers $21_d$ and $21_t$ connected respectively to the detection circuit 10 and to the transmission circuit 1. These two chambers are defined by the wall of the housing, a stationary transvers partition 22 arranged inside the housing and a flexible membrane 23, which can be deformed to engage opposite sides of the partition 22 by two identical pistons 24 and 25 mounted on a common support 26. A spring 27 engaging the support 26 and the opposed and adjacent wall of the housing 20 remote from the chambers $21_d$ and $21_t$ constantly ensures coincidence between the volume of all the incompressible hydraulic fluid in the hydraulic transmission unit and the enclosing volume offered to this fluid by the various parts of the hydraulic circuits.

The operation of this compensator device 20 is as follows: due to variation in local or overall temperature acting on the hydraulic transmission unit, the volume of liquid in the detection circuit 10 is subjected to variation, which causes a variation of volume in the chamber $21_d$ resulting in displacement of the two pistons 24 and 25. Because of the symmetrical nature of the chambers $21_d$ and $21_t$, the two chambers are subjected to the same variation in volume. Due to this fact, the chamber $21_t$ offers to the liquid of the transmission circuit 1 exactly the variation of volume which is necessary for it to compensate for the variation in the volume of liquid which it contains, this variation being detected by the compensation circuit 10. Due to this fact, the transmission function and characteristic of the circuit 1 is maintained constant.

The strengths of the springs 27 and 3_b are selected to ensure that the hydraulic circuits 1 and 10 are always filled with hydraulic liquid.

The compensator device 30 of FIG. 2 comprises a housing inside which two membranes 31 and 32 define a first fluid chamber 33, a second fluid chamber 34, and a third chamber 35. In the intermediate chamber 34, there is arranged a piston 36 disposed between and in contact with the two membranes 31 and 32. In the chamber 35, there is provided a piston 37, the effective surface of which is twice that of the piston 36, and which is constantly urged against the membrane 32 by a spring 38 which also urges the piston 36 against the membrane 31 through the intermediary of the membrane 32. The chamber 33 is connected to the detection circuit 10 and the chamber 34 to the transmission circuit 1.

The operation of the compensator device 30 is as follows: any variation in temperature detected by the circuit 10 is translated by a variation in volume of the chamber 33 which causes a displacement of the piston 36 and of the piston 37. Because of the displacement of the piston 36, the chamber 34 undergoes a variation in volume equal in value and opposed in direction (increase or decrease) to that of the chamber 33. On the other hand, and simultaneously due to the displacement of the piston 37, which is coaxial to the piston 36 and which has twice its effective area, the chamber 34 undergoes a variation in volume of twice the value and in the same direction (increase or decrease) as the chamber 33. Thus overall, the chamber 34 undergoes a variation in volume of the same value and in the same direction (increase or decrease) as the chamber 33.

Thus, as previously, any variation in volume of the liquid in the circuit 10 is translated by a corresponding variation in volume offered to the liquid of the transmission circuit 1. Due to the similarity of the two circuits and their disposition and arrangement, which causes them to undergo the same local and overall variations in temperature, the transmission circuit finally acts, independently of variations in temperature to control the orientation of headlamps 4.

Naturally, the present invention is not limited to the embodiments described, but extends to all variations within the scope of the accompanying claims. In a general manner, the invention extends to any transmission system comprising in addition to a transmission circuit, a closed detection circuit representing by variations in volume of a chamber to which it is connected the variation in volume of the liquid in the transmission circuit caused by variations in temperature, the transmission circuit being connected to a compensation chamber, the variations in volume of which are controlled by the variations in volume of the chamber connected to the detection circuit. Without departing from the scope of the invention, there can be employed a detection circuit and a transmission circuit which are similar, but not identical, having proportional volumetric variations by using the pistons 36, 37; 24 and 25, having appropriate ratios of effective areas.

I claim:
1. A hydraulic transmission system comprising:
(a) a control member,
(b) a controlled member,
(c) a liquid filled transmission pipe, connecting said control and controlled members, for transmitting liquid displacements in said control member to said controlled member,
(d) a compensator device having a variable volume compensating chamber,
(e) means through which said transmission pipe communicates with said compensating chamber,
(f) a liquid filled detection pipe in close proximity to said transmission pipe,
(g) a fixed closure closing one end of said detection pipe, the other end of said detection pipe being connected to said compensator device, and
(h) means forming part of said compensator device and responsive to variations in volume of the liquid in said detection pipe for correspondingly varying the volume of said compensating chamber, said responsive means being responsive to volume variations only in said detection pipe without regard to volume variations in said transmission pipe,
whereby when the liquid volume in said detection pipe changes due to temperature variations, the volume of said compensating chamber correspondingly changes to alter the effective volume avaliable to be filled by the liquid in said transmission pipe thereby making the transmission system immune to temperature variations.

2. A hydraulic transmission system as defined in claim 1 including a movable piston in said compensating chamber for varying the volume of the latter, and wherein said means (h) includes a detection chamber with which said detection pipe communicates, a movable piston in said detection chamber, and means for transmitting movement of said piston in said detection chamber to said piston in said compensating chamber.

3. A hydraulic transmission system as defined in claim 2 wherein said chambers are arranged side by side in a housing, said chambers being defined by the housing walls, a partition between them, and a flexible membrane, and including a spring urging said pistons against said membrane to ensure that the chambers are always filled with liquid.

4. A hydraulic transmission system as defined in claim 1 wherein said means (h) includes a detection chamber adjacent to said compensating chamber, a first membrane separating said two chambers and constituting a wall of each chamber, a second membrane forming another wall of one of said chambers, and a piston acting upon each membrane said pistons being arranged in tandem so that movement of one causes the other to move, and one of said pistons having an effective cross-sectional area one-half that of the other.

5. A hydraulic transmission system as defined in claim 1 wherein the hydraulic transmission system is carried by a vericle, and including a headlamp movably mounted on the vehicle, and means linking said headlamp to said controlled member.

References Cited
UNITED STATES PATENTS

| | | | |
|---|---|---|---|
| 2,339,132 | 1/1944 | Arnot | 60—54.5 |
| 2,592,613 | 4/1952 | Snyder | 138—31 |
| 2,659,382 | 11/1953 | Ifield | 138—31X |
| 2,740,357 | 4/1956 | Plank | 138—26X |
| 3,182,458 | 5/1965 | Smith | 60—54.5 |

HERBERT F. ROSS, Primary Examiner

U.S. Cl. X.R.

60—54.5